United States Patent [19]
Kashiwagi et al.

[11] Patent Number: 5,229,866
[45] Date of Patent: Jul. 20, 1993

[54] IMAGE PROCESSING SYSTEM FOR REDUCING WAIT TIME BEFORE IMAGE DATA TRANSFER TO AN IMAGE OUTPUT SECTION

[75] Inventors: Hideaki Kashiwagi; Naoji Tsutsumi, both of Kanagawa, Japan

[73] Assignee: Fuji Xerox Co., Ltd., Tokyo, Japan

[21] Appl. No.: 595,221

[22] Filed: Oct. 10, 1990

[51] Int. Cl.⁵ .............................................. H04N 1/21
[52] U.S. Cl. .................................. 358/444; 358/426
[58] Field of Search .......... 358/444, 426, 261.1–261.4; 382/56; 358/400–401; 379/100

[56] References Cited

U.S. PATENT DOCUMENTS

| | | | |
|---|---|---|---|
| 4,581,656 | 8/1986 | Wada | 358/426 |
| 4,783,841 | 11/1988 | Crayson | 382/56 |
| 4,814,898 | 3/1989 | Arimoto et al. | 358/426 |
| 4,890,249 | 12/1989 | Yen | 382/56 |
| 4,937,681 | 6/1990 | Fujinawa et al. | 358/426 |
| 4,942,479 | 7/1990 | Kanno | 358/444 |
| 5,027,221 | 6/1991 | Histake et al. | 358/401 |
| 5,046,122 | 9/1991 | Nakaya et al. | 382/56 |

*Primary Examiner*—Stephen Brinich
*Attorney, Agent, or Firm*—Finnegan, Henderson, Farabow, Garrett & Dunner

[57] ABSTRACT

An image processing system including an image read section for reading an image on a document, data compressing means for compressing image data as read by the image read section, data decompressing means for decompressing the image data compressed by the data compressing means, an image output section for outputting the image data as decompressed by the data decompressing means in the form of a hard copy, data storage means for storing the image data as compressed by the data compressing means, a page buffer for storing the data of a plurality of pages every page, the data being transferred to and from the data storage means, and control means for controlling the compressing and decompressing of the data by the data compressing means and the data decompressing means, and the data transfer between the data storage means and the page buffer that is done every page. When the image data is transferred from the data storage means to the image output section, the control means reads the image data of two pages from the data storage means and successively stores the image data of two pages into the page buffer, and stores image data of the next page into the page buffer if the image data of one page is read out of the page buffer.

23 Claims, 9 Drawing Sheets

FIG. 11(B) TRANSFER SCAN REQUEST

FIG. 11(C)

IMAGE PROCESSING SYSTEM FOR REDUCING WAIT TIME BEFORE IMAGE DATA TRANSFER TO AN IMAGE OUTPUT SECTION

BACKGROUND OF THE INVENTION

1. Field of the Invention

The present invention relates to an image processing system in which image data, as read by an image read section, is compressed and stored into a large capacity memory, the image data is read out of the memory and decompressed into the original image data, and the decompressed data is output to an image output section.

2. Discussion of the Related Art

A conventional RDH (recirculating document handler) repeatedly reads images from a plurality of documents in succession using an automatic document reader, and outputs a required number of copies. A more recently developed electronic RDH outputs a required number of copies after only reading the documents one time. The more recent electronic RDH employs a memory of large memory capacity, such as a hard disk and a semiconductor memory, for storing image data. To output a required number of copies, a plurality of documents are each read one time in successive order. Then, the image data as read are stored into the memory. The image data are repeatedly read out of the memory in sequential order, and transferred to the image output section. Finally, the required number of copies are output.

The image data contains a large amount of information, and, thus requires a large capacity memory to store the image data. To cope with this, a compressor and a decompressor (also called an "expander") are used. Before the image data is stored into the memory, it is compressed by the compressor. The image data as compressed and stored are read out of the memory and decompressed by the decompressor to restore the original data. The decompressed data is then transferred to the image output section.

Where a hard disk (HD) is used for the memory, time required to read image data out of the HD is longer than the time required for the decompressing processing image data and output processing by the decompressor and the image output section. To compensate for the timing difference, a page buffer is used. The image data is read out of the hard disk every page, and loaded into the page buffer. The image data is read out of the page buffer and transferred to the decompressor. The image data, as decompressed by the decompressor, is sent to the image output section, and is output in hard copy form. Operation of the electronic RDH will be described briefly below.

Figure 1:
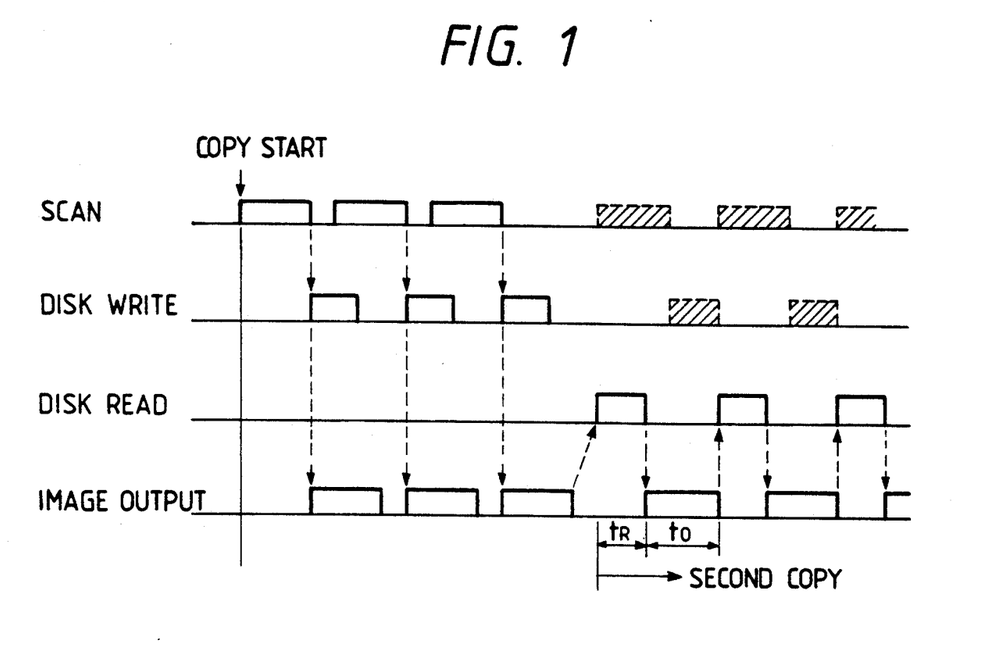
FIG. 1 shows a timing chart for explaining the operation of an electronic RDH.
Figures 2, 3:
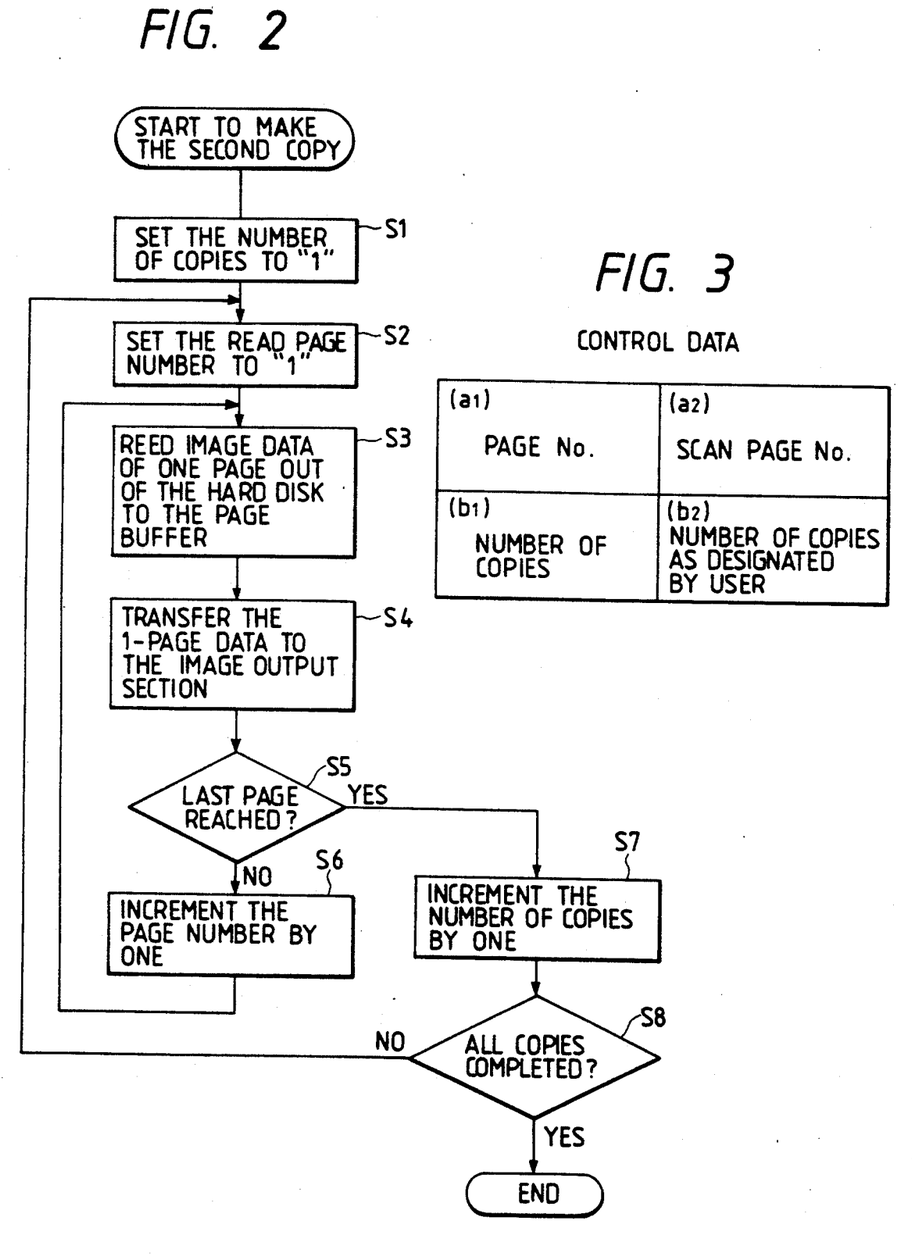
FIG. 2 shows a flow chart explaining the output processing of a second copy and of subsequent copies.
FIG. 3 is a diagram explaining the control data for FIG. 2.

FIG. 1 shows a timing chart useful in explaining an operation of the electronic RDH. FIG. 2 shows a flow chart useful in explaining the output processing of a second and of subsequent copies.

When a copy start key is pressed, the electronic RDH starts scanning to read an image for the first copy, as shown in FIG. 1. The image data read are sequentially stored into a disk and are then output. FIG. 1 shows the scanning operation for an original having three pages. For the second and subsequent copies, the image data is read out of the disk successively from the first page to the last (page 3), and the images are output. The sequence of operations is repeated until designated number of copies is obtained.

The output processing of the second and subsequent copies will be described in detail with reference to FIG. 2. First, the number of copies is set to "1" (step S1). Next, the read page number is set to "1" (step S2), image data of one page are read out of the hard disk and stored into the page buffer (step S3), and the one-page data thus stored are transferred to the image output section (step S4). Next, it is determined whether or not the last page has been reached or completed (step S5). When the last page has not been reached, the page number is incremented by one (step S6), and step S3 and subsequent steps are re-executed. On the other hand, when the last page has been reached, the number of copies is incremented by one (step S7), and it is determined whether or not all copies has been completed (step S8). When all copies have not been completed, step S2 and subsequent steps are re-executed.

In the image processing system of the type in which image data is read out of the hard disk to the page buffer every page, and then is transferred to the image output section, control must wait until the reading of the image data from the hard disk is completed and before it transfers tho data to the output section. This wait time occurs for every page and slows the image outputting speed. When copying the second and subsequent documents, one cycle of the image outputting consists of the sum of the read-out time $t_R$ of the hard disk and the time to of the image outputting, $t_R + t_o$, as shown in FIG. 1. Therefore, the time taken to copy the documents of "n" pages is $n \times (t_R + t_o)$.

Figure 4:
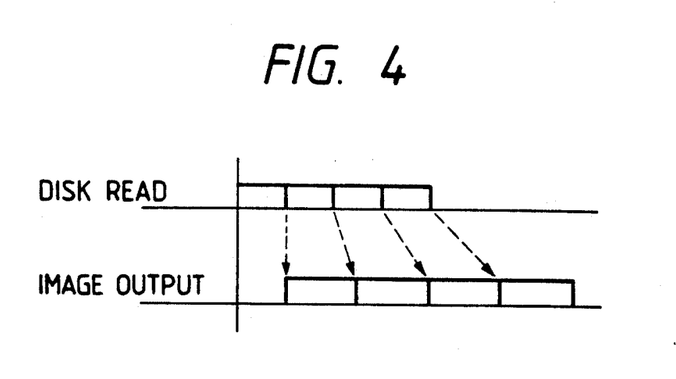
FIG. 4 is a diagram showing how the reading of the image data out of a hard disk and the transferring the image data to an output section progress concurrently.

A method, illustrated in FIG. 4, has been proposed to cope with this problem. In FIG. 4, the transfer of the image data from the hard disk to the page buffer is continued without interruption until the image data of one page is completed, and subsequently the data transfer from the hard disk to the page buffer progresses concurrently with the data transfer from the page buffer to the image output section. This method, however, has the following problems:

(1) Because the read-out operation from the disk is uninterrupted, data cannot be written into the disk during the execution of parallel jobs.

(2) When the data is read out of the disk faster than the image outputting speed, the page buffer fills up with data and creates a bottleneck.

SUMMARY OF THE INVENTION

The present invention solves the problems discussed above. It is an object of the present invention to provide an image processing system that reduces the wait time before the image data transfer to the image output section, thereby speeding up the image output operation.

A further object of the present invention is to provide an image processing system that enables jobs progressing in parallel to write data into the hard disk.

Additional objects and advantages of the invention will be set forth in part in the description which follows and in part will be obvious from the description, or may be learned by practice of the invention. The objects and advantages of the invention may be realized and attained by means of the instrumentalities and combination particularly pointed out in the appended claims.

To achieve the objects and in accordance with the purpose of the invention, as embodied and broadly described herein, the image processing system of the this invention in which the image data from an image input section is compressed and stored, the image data as stored is read out and decompressed, and transferred to an image output section, the image processing system comprises: data compressing means for compressing image data; data decompressing means for decompressing the compressed image data into the original image data; data storage means of large memory capacity for storing data; a page buffer for storing the image data to be transferred to and from the data storage means; and control means for controlling the compression and expansion of the image data, and the transfer of the image data to and from the data storage means, when the image data is transferred from the data storage means to the image output section every page, the control means reading in advance the image data of two pages from the data storage means, loading the image data into the page buffer, reading the image data from the page buffer, and outputting the image data to the image output section through the page buffer.

In the image processing system according to the present invention, when the image data is transferred from the data storage means to the image output section every page, the control means reads in advance the image data of two pages from the data storage means, loads the image data into the page buffer, reads the image data from the page buffer, and outputs the image data to the image output section, through the page buffer. With such an arrangement, during the outputting of the image data, the next image data can be read out of the data storage means or can write the image data into the data storage means.

BRIEF DESCRIPTION OF THE DRAWINGS

The accompanying drawings, which are incorporated in and constitute a part of this specification illustrate an embodiment of the invention and, together with the description of the embodiment, serve to explain the object, advantages and principles of the invention. In the drawings.

DETAILED DESCRIPTION OF THE PREFERRED EMBODIMENT

Figure 5:
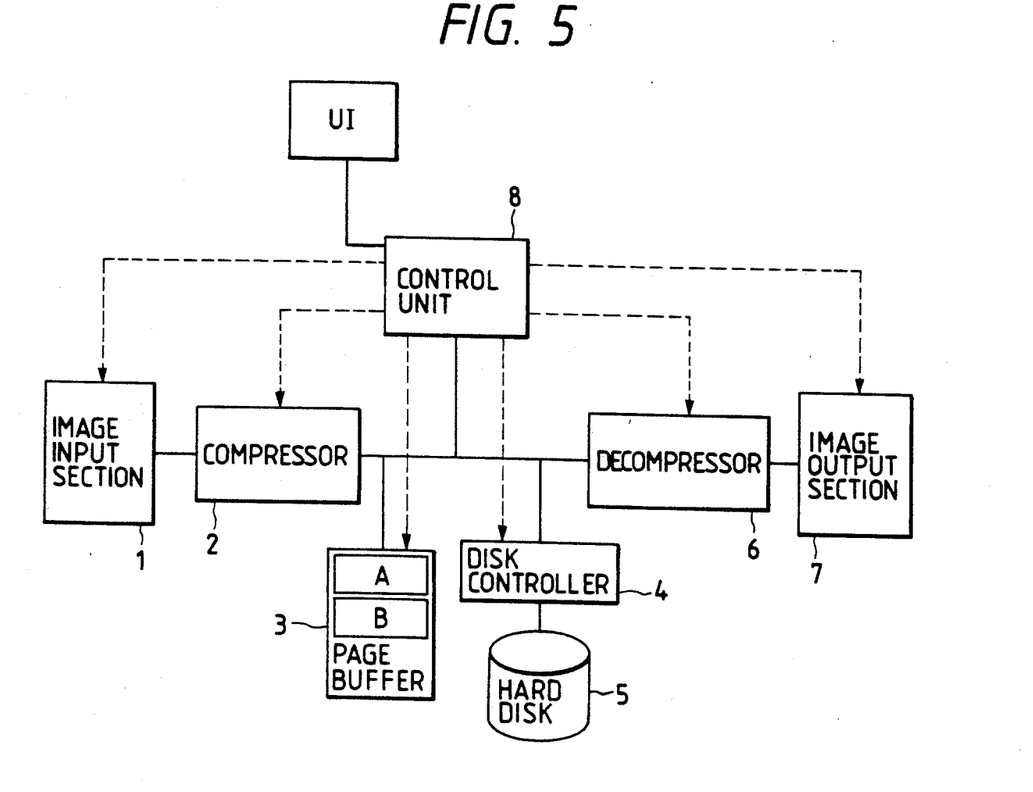
FIG. 5 is a combined block and schematic diagram of an image processing system according to the present invention.
Figure 6:
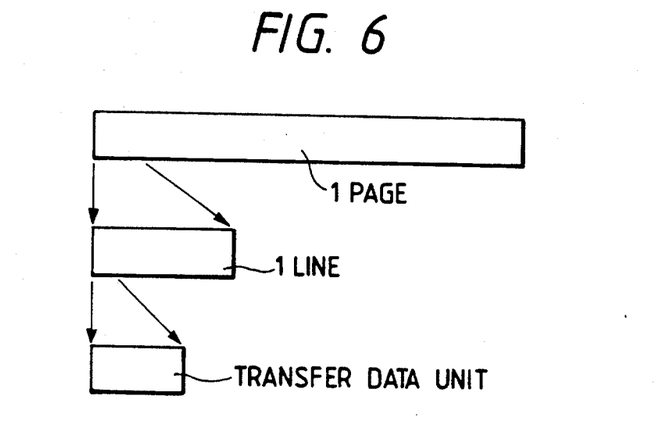
FIG. 6 is a diagram showing a relationship between image data of one page and a transfer data unit.

FIG. 5 is a combined block and schematic diagram of an image processing system according to an embodiment of the present invention. FIG. 6 is a diagram showing a relationship between image data of one page and a transfer data unit.

In FIG. 5, an image input section 1 reads an image on a document by means of a CCD sensor, for example. In the image input section 1, the analog image data as read is subjected to offset and gain adjustment. The image data is then converted into digital image data. Further, the image data is subjected to a gap correction for correcting gaps among sensor pixels, and a shading correction among the sensor pixels. To read a color image, the image input section 1 separates the image into three primary colors of R (red), G (green), and B (blue), and fetches the image data of separated colors of R, G, and B. The image data are subjected to END (equivalent neutral density) conversion, color masking, document size detection, color conversion, UCR (under color removal), black generation, mesh-point removal, edge emphasis, TRC (tone reproduction control), enlargement/reduction, various types of edits, and the like, as are known to persons of ordinary skill in the art.

A compressor 2 is operable in two modes: a compression mode and a through mode. In the compression mode, the compressor 2 compresses the image data by using an adaptive prediction coding (APC) system. Further, the compressor 2 includes plural kinds of predictors which are used in a predetermined order. In the adaptive prediction coding system, the data pattern of predictor is compared with the image data every unit of pixel or pixels by a predictor. If no error occurs, "0" is assigned to the error data to execute run-length coding and the predictor is used continuously to compress the image data. On the other hand, if an error occurs, an error data code corresponding to the error data is assigned and the predictor is changed to the next predictor to compare the image data. The compressed data is decompressed or expanded into the original image data by a decompressor 6 including a plural kinds of reverse predictors which are used in a predetermined order.

A page buffer 3 stores the image data representing documents of several pages, as read by the input section 1. More specifically, the page buffer 3 temporarily stores the image data to be written into or read out of a hard disk 5. For example, page A and page B are shown to be stored in page buffer 3. In addition, the page buffer 3 is used to temporarily store the image data transferred from the image input section 1 without writing it into the hard disk 5. A control unit 8 performs an edit operation, such as a data alteration, and transfers the edited data to an image output section 7.

The hard disk 5 has a large memory capacity for storing a large amount of compressed image data, and is under control of a disk controller 4.

The decompressor 6 is operable in two modes, a decompression (also called an "expanding mode") and a through mode. In the decompression mode, the decompressor 6 decompresses the compressed data to yield the original image data.

The image output section 7 reproduces an original image of halftones in the form of a group of mesh dots by controlling a laser beam to turn every pixel on or off.

The control unit 8 controls the overall system, alters the data stored in the page buffer 3 and the hard disk 5, and processes the data in other ways.

The hard disk 5 has an access time that is longer than the processing time of the compressor 2 and the decompressor 6 combined. To absorb the speed difference, the page buffer 3 is provided. The page buffer 3 intervenes in the transfer of data from the image input section 1 to the disk 5, and from the disk 5 to the image output section 7.

The compressor 2 and the decompressor 6 each fetch and store the data every transfer data unit, as described below. As shown in FIG. 6, for image data of one page, the image data of one line is further divided into small data segments. Each data segment is used as one transfer data unit. Accordingly, during the compressing and decompressing of the fetched image data by the compressor 2 and the decompressor 6, the bus is released. During processing for the image data of one page, if the image data is processed every transfer data unit in a time divisional manner, concurrent processing, i.e., executing in a parallel fashion, is allowed.

Figure 7:
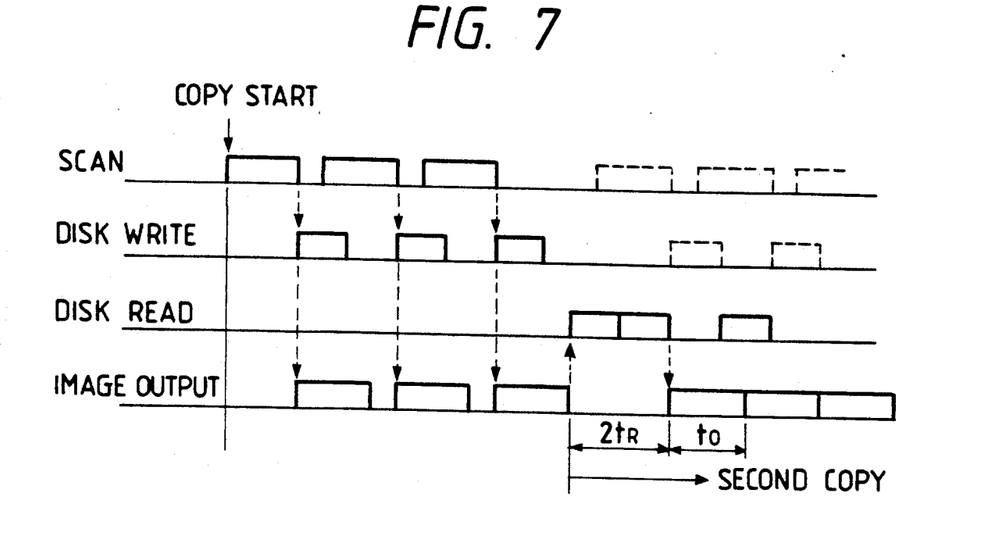
FIG. 7 shows a timing chart useful in explaining an operation of the image processing system according to the present invention.

FIG. 7 shows a timing chart explaining an operation of an image processing system according to the present invention. As shown in FIG. 7, the copying and outputting operations of the second and subsequent documents are controlled such that, when the image data is read out of the disk 5 and transferred to the page buffer 3 and is sent to the image output section through the decompressor 6, the image data of two pages is read out of the hard disk 5 in advance. The copying and outputting operations of the first document are the same as described with reference to FIG. 1. In FIG. 7 the documents of "n" number of pages are all copied and output in time $(n \times t_o) + (2 \times t_R)$. Accordingly, the present control method speeds up the operation of the image processing system by $(n-2) \times t_R$ when compared with the conventional case of $n \times (t_o + t_R)$, as described above. As indicated by dotted lines in FIG. 7, the reading operation of the data from the disk and the image outputting operation may be concurrent with the next scan and the writing operation of the image data into the disk.

Figure 8:
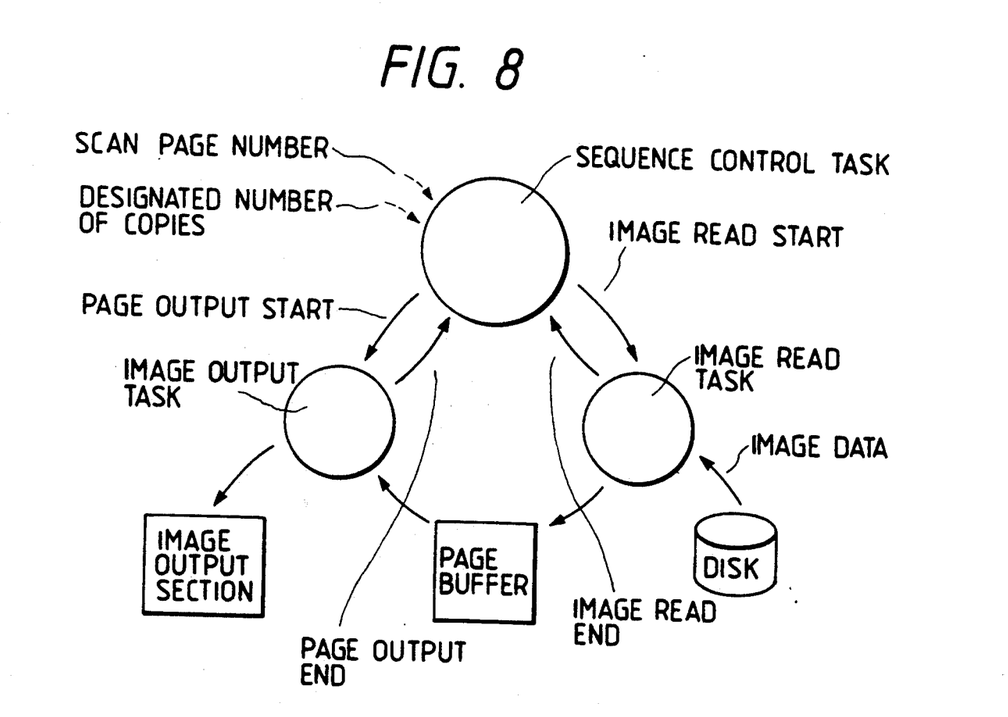
FIG. 8 is a diagram showing how different tasks are executed concurrently using the present invention.
Figure 9:
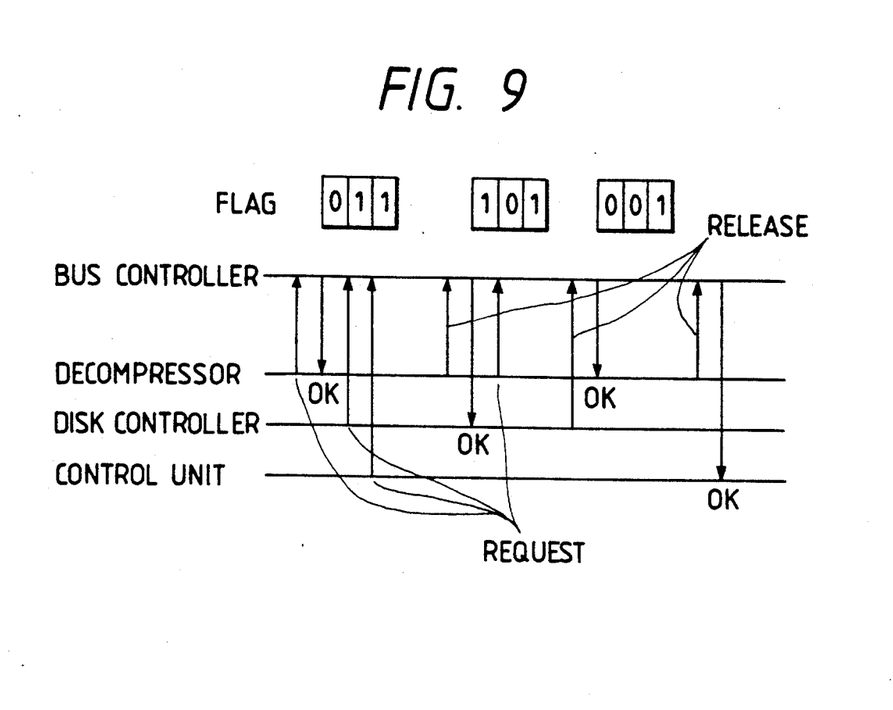
FIG. 9 is a diagram showing how a bus is controlled in response to different bus use requests.
Figure 10:
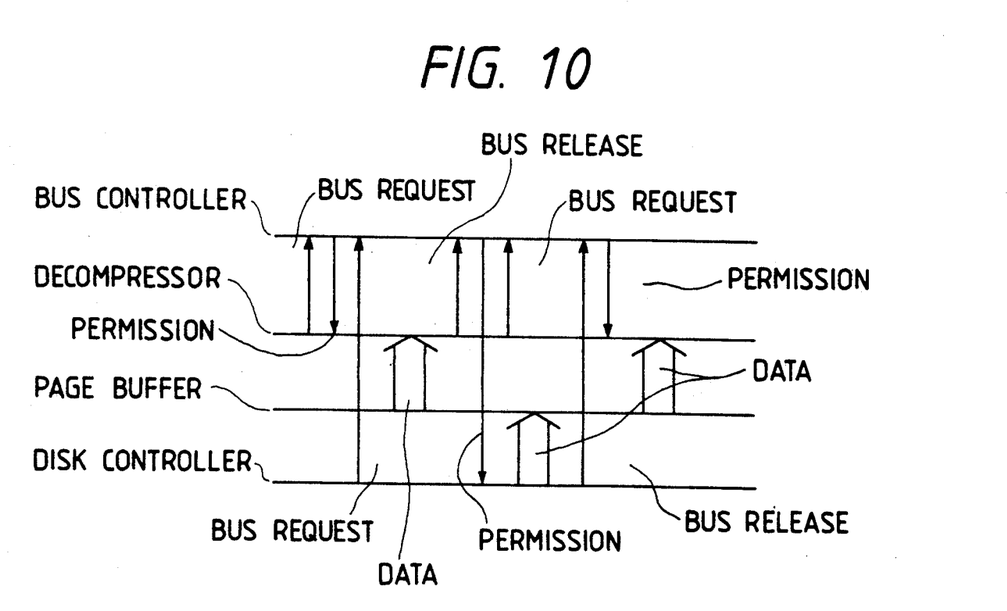
FIG. 10 is a diagram showing relationships between the bus control and data flows.

FIG. 8 is a diagram showing how different tasks are executed concurrently using the present invention. FIG. 9 is a diagram showing how the bus is controlled in response to different bus use requests. FIG. 10 is a diagram showing relationships between the bus control and data flows.

In the present invention, the image processing system is controlled by three tasks, sequence control task, image read task, and image output task, which are concurrently executed, as shown in FIG. 8. The sequence control task consists of the following steps:

(1) To drive the image read task, and to read the image data of two pages from the disk and load the data into the page buffer, (2) To drive the image output task, and to output the image data of one page as read in the step (1) above to the image output section, (3) To wait until the outputting of one page of image data by the image output task is completed, (4) To simultaneously drive the image read task and the image output task, and to instruct them to read the image data of the next page and output an image, and (5) To repeat the steps (3) and (4) until all of the copies are outputted.

In the present invention, the decompressor 6, disk controller 4, and the control unit 8 are prioritized by a bus controller, for example. The seizure of the bus is controlled every transfer data unit. The data transfer to and from the disk, and the image outputting progress concurrently. Flags are used to check whether or not a bus request is present, for example, as shown in FIG. 9. The bus request whose flag has the highest turned-on bit is accepted at the highest priority. It is assumed that flags of the decompressor 6, disk controller 4, and the control unit 8 are arranged from the high order to the lower order, respectively. When those elements issue bus requests, the flags of the requests are turned on. If all the flags are on, a right of exclusively using the bus is given to the decompressor 6 at the highest priority, and its flag is turned off.

In FIG. 9, when the transfer of the data of the transfer data unit is completed, and the bus is released, the right of the exclusive use of the bus is given to the controller 4, which has a higher priority than the control unit 8. When the bus is released by the disk controller 4, the right of the exclusive use of the bus is given to the control unit 8. If the decompressor 6 has issued a bus request before the right is given to the control unit 8, the decompressor 6 obtains the right prior to the control unit 8.

In the image outputting operation, the decompressor 6 and the disk controller 4 are bus controlled as shown in FIG. 10. When the decompressor 6 issues a bus request, the bus controller 4 permits use of the bus by the decompressor 6. Then, if the disk controller issues a bus request, the bus controller permits use of the bus by the disk controller after the bus is released from the use by the decompressor. In this case, the decompressor, when its bus request is accepted by the bus controller, starts to transfer the data from the page buffer. After the decompressor fetches the data and completes the data transfer, it releases the bus and the disk controller issues a bus request. However, the decompressor currently seizes the bus (i.e., the bus is busy). Accordingly, the disk controller waits until the bus controller permits the use of the bus by the disk controller. If permitted, the disk controller starts to transfer data to the page buffer, and releases the bus after the data transfer is completed. This sequence of operations is repeated to execute the image output processing following the route of disk-→disk controller→page buffer→decompressor. After the decompressor fetches data from the page buffer, it takes a time to decompress the fetched data. In addition, after the disk controller completes the data transfer to the page buffer, it takes a time to read the next data from the disk. During the decompressing time and the data read time, the bus is idle. Accordingly, during this time period, the bus can be used for other processing.

FIGS. 11(A) through 11(D) are diagrams showing an operation of the image processing system by using a message flow.

Figure 11A:
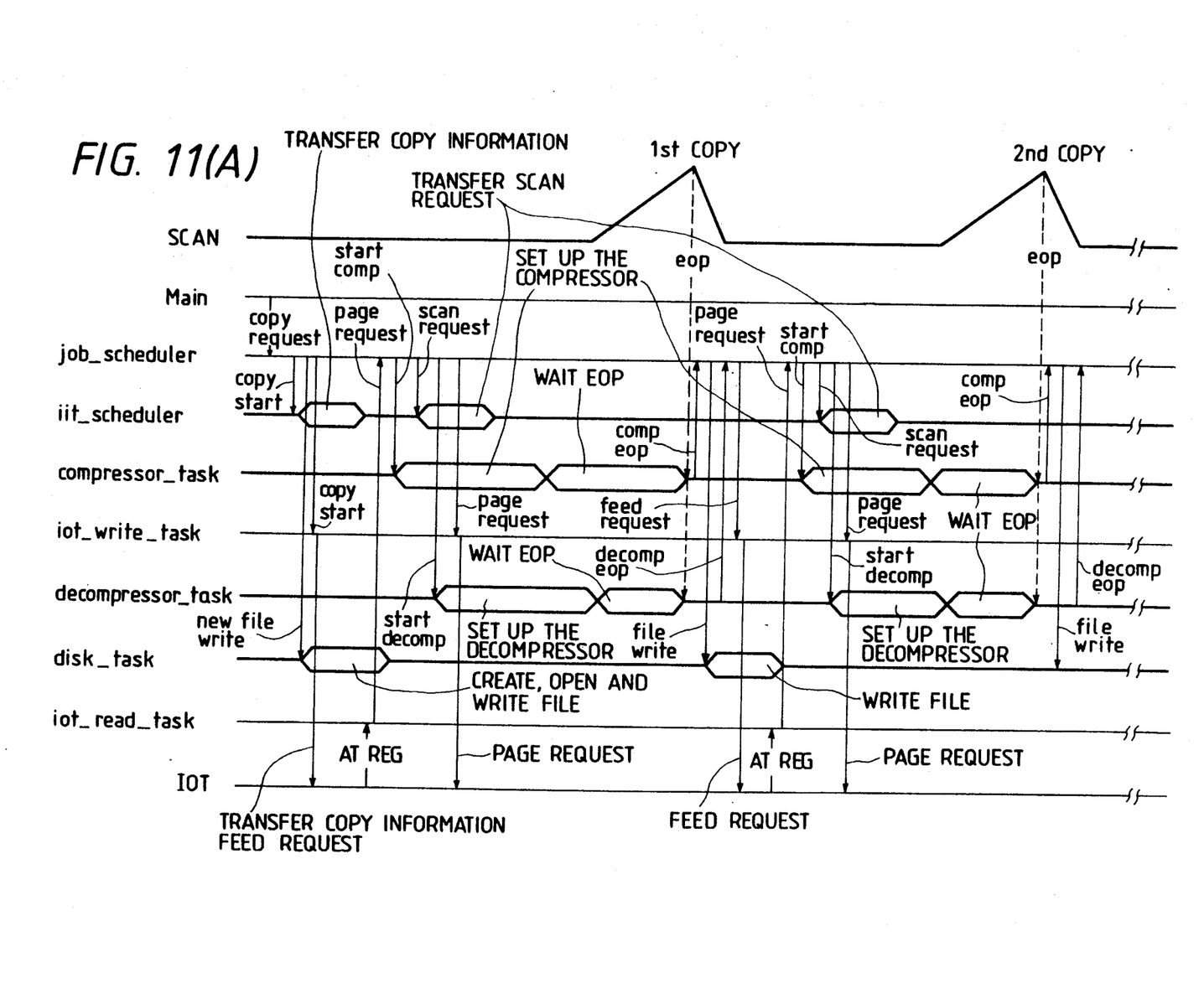
FIGS. 11(A) through 11(D) are diagrams showing an operation of the image processing system by using a message flow.
Figure 11B:
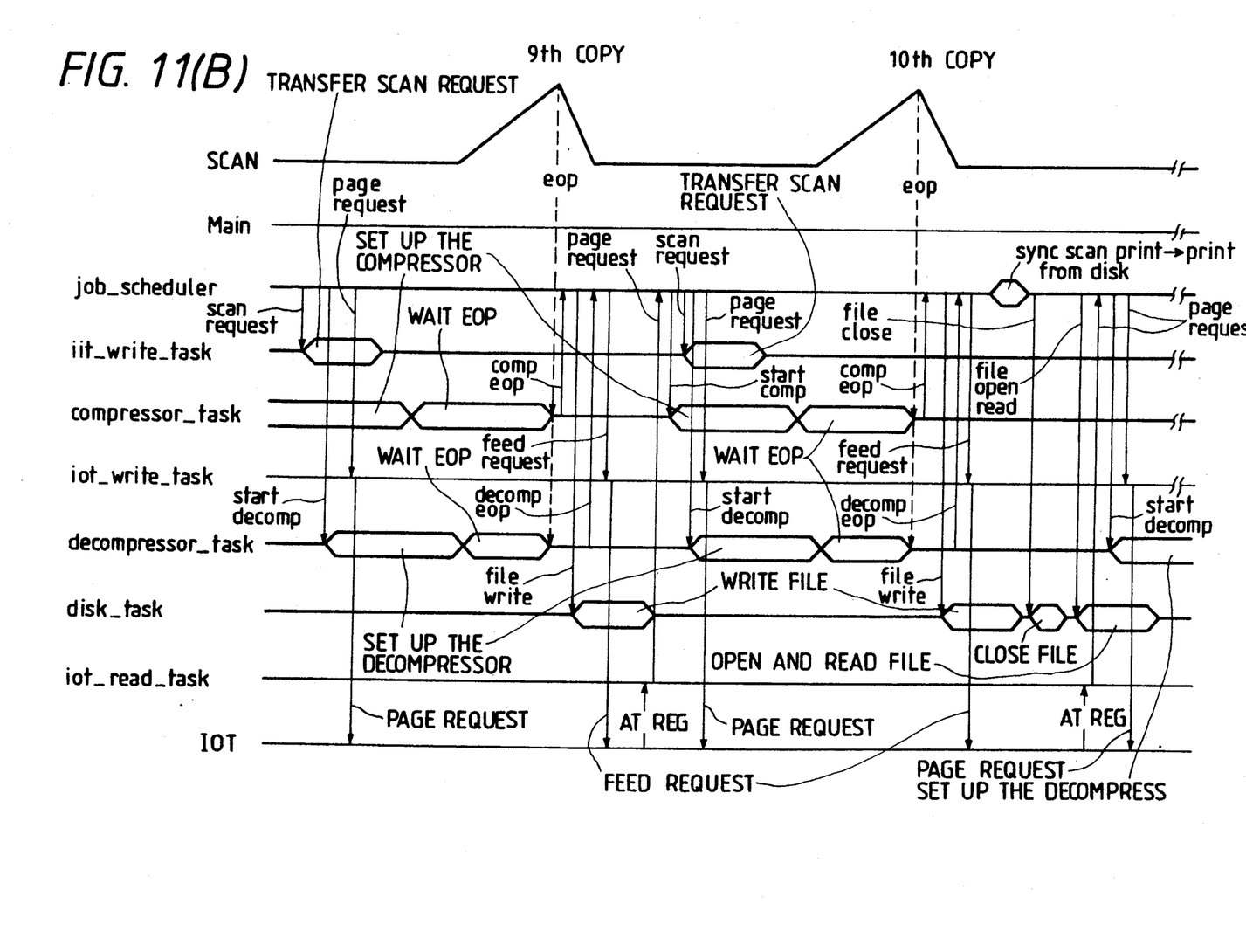

In the following example, ten documents are to be copied, and two copies are to be made of each document. First, a user enters a copy start command to the image processing system. In response to the command, a job scheduler, as shown in FIG. 11(A), sends the copy start an IIT (image input terminal) write task and an IOT (image output terminal) write task, and sends a new file write to a disk task. In response to this command, the IOT write task sends copy data and a feed request to the IOT. When a copy is fed to the registration position in the IOT, the IOT read task sends a page request to the job scheduler. In response to this, the job scheduler starts a compressor task and a decompressor task, and sends a scan request to the IIT write task. At the same time, the job scheduler sends a page request to the IOT write task. In response to this, the IOT write task sends a registration request to the IOT.

When the compressor and decompressor are set up, the compressor task and the decompressor task wait for an end of page (EOP) which is issued by the scanner after the scan is terminated, and send the end of page to the job scheduler. Then, the job scheduler sends a file write to the disk write task, and a feed request to the IOT write task. The IOT write task sends a feed request to the IOT. The above sequence of operations is repeated until the ten documents are copied (see FIG. 11(B)).

When the processing of the tenth document is completed, control is synchronized to read out the image data from the disk and to print the data. Then, a file close is sent to the disk task, and the file is closed. Next, control sends a file open read to the disk task causing it to execute an open read for the file. When a paper is fed to the registration position in the IOT, the IOT read task sends a page request to the job scheduler. In turn, the job scheduler starts the decompressor task, and sends a page request to the IOT write task, causing the IOT writing task to send a page request to the IOT.

Figure 11C:
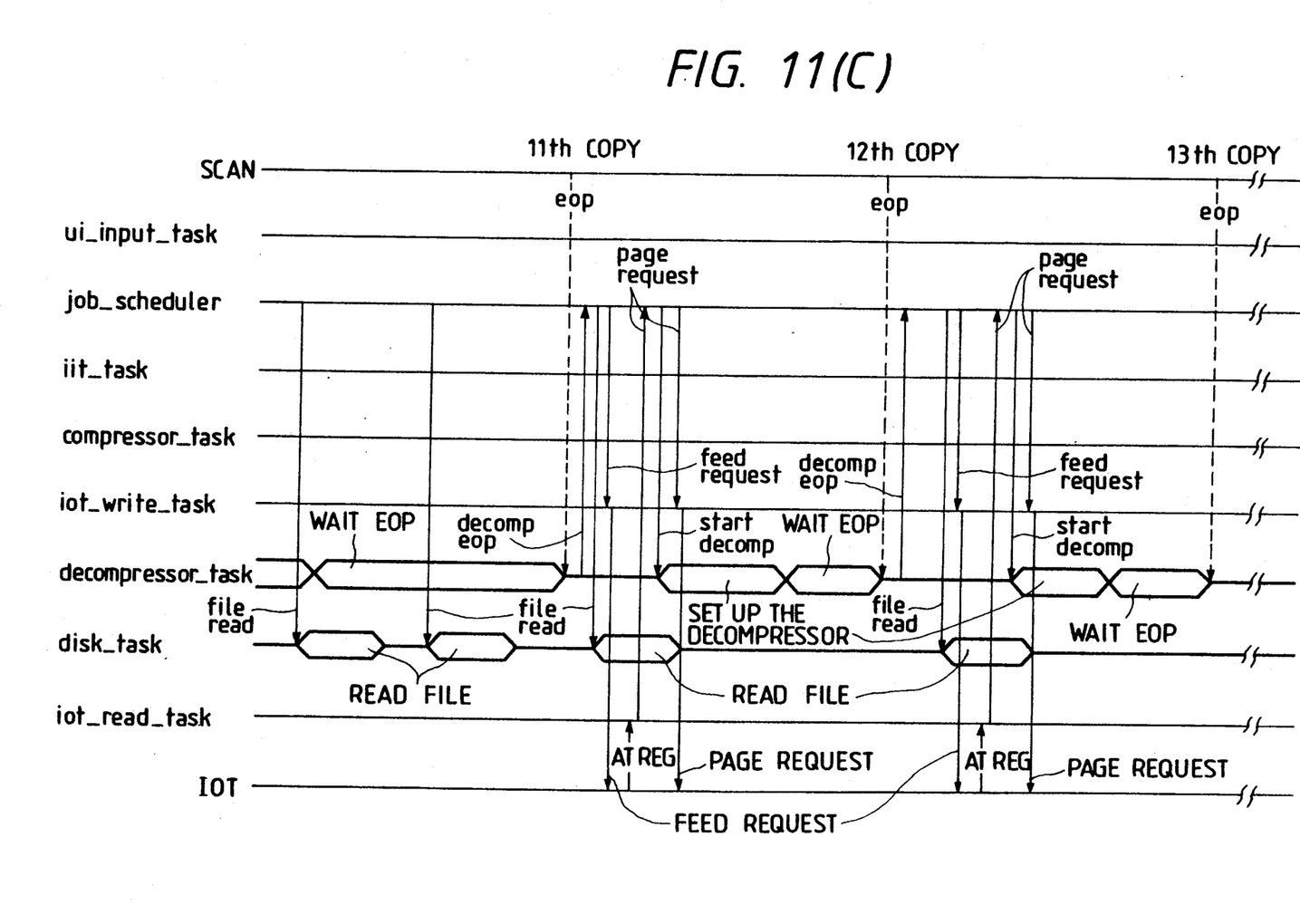

Subsequently, the job scheduler successively sends file reads of two pages to the disk task, as shown in FIG. 11(C). By an end of page (EOP), the decompressor task sends a decompressor end of page to the job scheduler. At this time, the job scheduler sends a file read for the next page to the disk task, and at the same time sends a feed request to the IOT write task. When a paper is set at the registration position in the IOT, the IOT read task sends a page request to the job scheduler. The job scheduler sends a start decompressor to the decompressor task, to set the decompressor, and sends a page request to the IOT write task. Then, the IOT write task sends a feed request to the IOT.

Figure 11D:
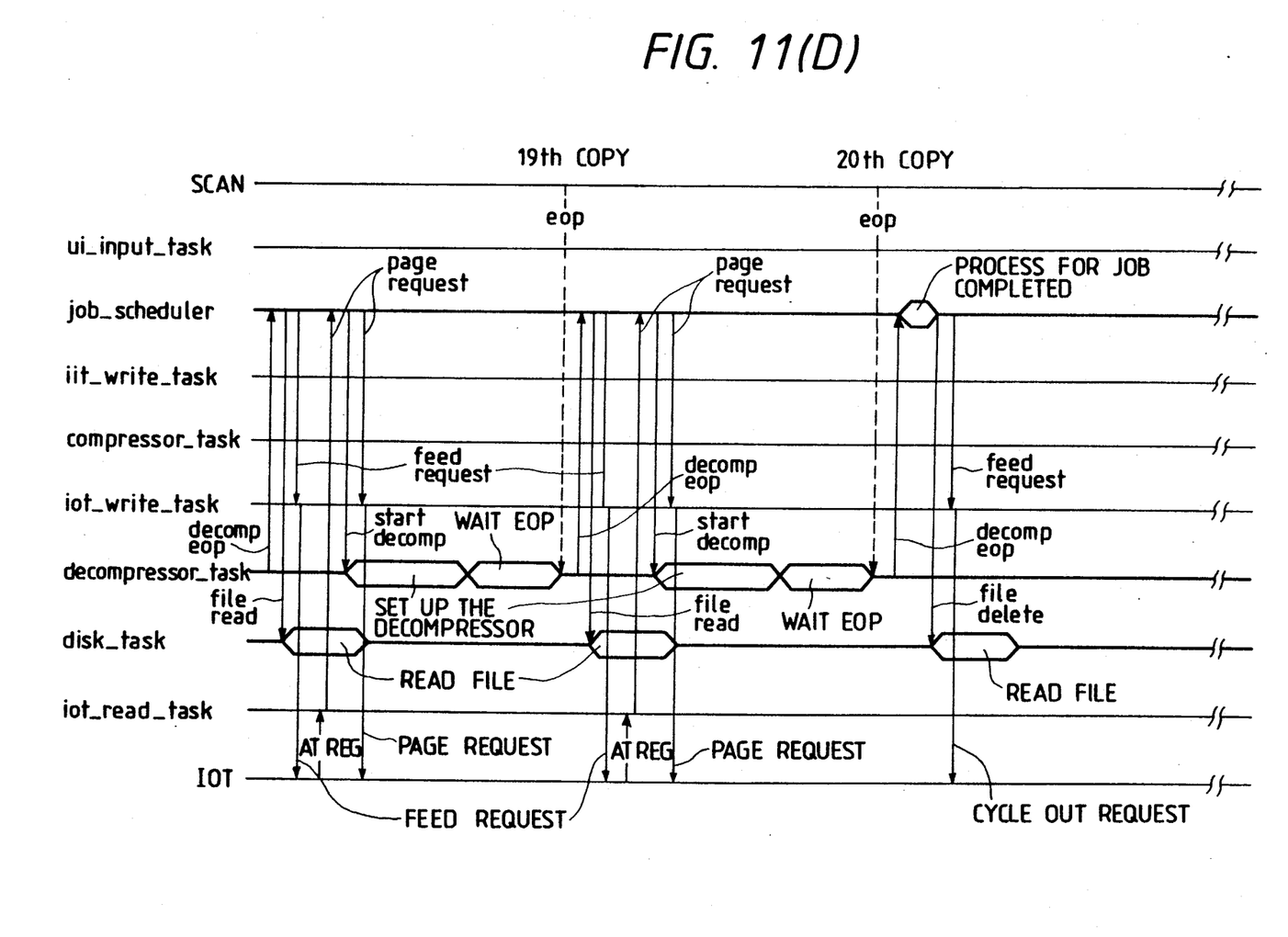

Subsequently, by an end of page (EOP), the decompressor task sends a decompressor end of page to the job scheduler. A similar sequence of operations is repeated up to the twentieth document. At the end of the processing of the twentieth document, the job scheduler executes the processing to end the job, and the processings subsequent to it, as shown in FIG. 11(D).

It should be understood that the present invention is not limited to the above-mentioned embodiment, but may variously be changed and modified within the scope of the invention. For example, the disk is used for data storage, but other types of memory devices having a large memory capacity, such as a semiconductor memory could also be used. When the amount of the image data is for only one page, it is not necessary to read the image data into the page buffer in advance. Accordingly, in this case, the system will be designed so as to determine whether or not the image reading in advance is required on the basis of the number of pages for each job, and not to read the image data in advance when the amount of the image data is for one page. When the disk is full of data during the document read data may be successively loaded into the page buffer. In this case, the data area to store two pages of data must be reserved, because the image data of two pages are stored in advance at the time of the data outputting. The image input section, although the image read device is used in the above-mentioned embodiment, may be realized by a PC (personal computer), facsimile, or any other suitable device. In this case, the image data is input and stored at a time other than during the scan by the image read device.

As seen from the foregoing description, in the image processing system according to the present invention, the control unit reads in advance the image data of two pages from the disk and loads it into the page buffer. The outputting of the image data and the reading of image data of the next page are concurrently executed every transfer data unit in a time divisional manner. The wait time before the data transfer that is caused by the reading of image data from the disk is removed. Accordingly, the speed of a copying operation for producing a plurality number of copies can be improved. Furthermore, during the outputting of the image data from the disk, the next scan can be done and the next image data can be written into the disk. Accordingly, it is possible to read the job in advance.

The foregoing description of preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing system, comprising:
an image read section for reading image data representing an image from an original;
data compressing means, connected to the image read section, for compressing the image data read by said image read section;
data decompressing means for decompressing the image data compressed by said data compressing means;
an image output section, connected to the data decompressing means, for outputting the image data decompressed by said data decompressing means in the form of a hard copy;
data storage means, connected to the data compressing means and the data decompressing means, for storing the image data compressed by said data compressing means;
a page buffer, connected to the data storage means, for storing the data of a plurality of pages every page, said data being transferred to and from said data storage means; and
control means for controlling the compressing of the data by said data compressing means and the decompressing of the data by said data decompressing means, and for controlling the data transfer between said data storage means and said page buffer, said control means transferring at least two pages of image data to said page buffer from said storage means.

2. The image processing system of claim 1, wherein said control means transfers one page of image data from said storage means to said page buffer subsequent to a transfer of one page of image data from said page buffer to said decompressing means.

3. The image processing system of claim 2, wherein said transfer of one page of image data from said page buffer to said decompressing means occurs in response to said transfer of one page of image data from said storage means to said page buffer.

4. An image processing system according to claim 1, wherein said control means includes means for controlling storage of the image data as delivered from said image input section into said page buffer.

5. An image processing system according to claim 4, wherein said control means includes means for controlling storage of the image data as delivered from said image input section into said page buffer, with a memory area of at least two pages of said page buffer being left empty.

6. An image processing system according to claim 1, wherein said control means includes means for concurrently executing in a time divisional manner the data transfer between said data storage means and said page buffer, and one of the transfer of data through said data compressing means to said page buffer and the transfer of data through said data decompressing means to said image output section.

7. An image processing system according to claim 1, wherein said data compressing means, said data decompressing means, said data storage means, and said page buffer have a common data bus, and wherein a priority to exclusively use said data bus is established among said data compressing means, said data decompressing means, said data storage means, and said page buffer.

8. An image processing system according to claim 7, wherein a highest priority is given to said decompressing means.

9. An image processing system according to claim 7, wherein a highest priority is given to said compressing means.

10. An image processing system according to claim 7, wherein a highest priority is given to said page buffer.

11. An image processing system, comprising:
an image read section for reading image data representing an image from an original;
data compressing means, connected to the image read section, for compressing the image data read by said image read section;
data decompressing means for decompressing the image data compressed by said data compressing means;
an image output section, connected to the data decompressing means, for outputting the image data decompressed by said data decompressing means in the form of a hard copy;
data storage means, connected to the data compressing means and the data decompressing means, for storing the image data compressed by said data compressing means;
a page buffer, connected to the data storage means, for storing the data of a plurality of pages every page, said data being transferred to and from said data storage means; and
control means for controlling the compressing of the data by said data compressing means and the decompressing of the data by said data decompressing means, and for controlling the data transfer between said data storage means and said page buffer, said control means for transferring at least three pages of image data to said page buffer from said storage means.

12. The image processing system of claim 11, wherein said control means transfers one page of image data from said storage means to said page buffer subsequent to a transfer of one page of image data from said page buffer to said decompressing means.

13. The image processing system of claim 12, wherein said transfer of one page of image data from said page buffer to said decompressing means occurs in response to said transfer of one page of image data from said storage means to said page buffer.

14. An image processing system according to claim 11, wherein said control means includes means for concurrently executing in a time divisional manner the data transfer between said data storage means and said page buffer, and one of the transfer of data through said data compressing means to said page buffer and the transfer of data through said data decompressing means to said image output section.

15. An image processing system according to claim 14, wherein said data compressing means, said data decompressing means, said data storage means, and said page buffer have a common data bus, and wherein a priority to exclusively use said data bus is established among said data compressing means, said data decompressing means, said data storage means, and said page buffer.

16. An image processing system comprising:
an image read section for reading image data representing an image from an original;
data compressing means, connected to the image read section, for compressing the image data read by said image read section;
data decompressing means for decompressing the image data compressed by said data compressing means;
an image output section, connected to the data decompressing means, for outputting the image data decompressed by said data decompressing means in the form of a hard copy;
data storage means, connected to the data compressing means and the data decompressing means, for storing the image data compressed by said data compressing means;
a page buffer, connected to the data storage means, for storing the data of a plurality of pages, said data being transferred to and from said data storage means;
a distributor for distributing the compressed image data from said data compressing means to said page buffer for storing therein;
a selector for reading image data out of said page buffer; and
control means for controlling the compressing of the data by said data compressing means and the decompressing of the data by said data decompressing means, and for controlling the data transfer between said data storage means and said page buffer that is done in a predetermined order of pages, said control means transferring at least two pages of image data to said page buffer from said storage means.

17. An image processing system according to claim 16, wherein said control means includes means for concurrently executing in a time divisional manner the data transfer between said data storage means and said page buffer, and one of the transfer of data through said data compressing means to said page buffer and the transfer of data through said data decompressing means to said image output section.

18. An image processing system according to claim 17, wherein said data compressing means, said data decompressing means, said data storage means, and said page buffer have a common data bus, and wherein priority to exclusively use said data bus is established among said data compressing means, said data decompressing means, said data storage means, and said page buffer.

19. An image processing system comprising:

an image read section for reading image data representing an image from an original;

data compressing means, connected to the image read section, for compressing the image data read by said image read section;

data decompressing means for decompressing the image data compressed by said data compressing means;

an image output section, connected to the data decompressing means, for outputting the image data decompressed by said data decompressing means in the form of a hard copy;

data storage means, connected to the data compressing means and the data decompressing means, for storing the image data compressed by said data compressing means;

a page buffer, connected to the data storage means, for storing the data of a plurality of pages, said data being transferred to and from said data storage means;

job entering means for setting copy jobs by specifying the contents thereof, such as order of pages and output number of copies to said control means; and control means for controlling the compressing of the data by said data compressing means and the decompressing of the data by said data decompressing means, and for controlling the data transfer between said data storage means and said page buffer that is done in a predetermined order of pages, said control means transferring at least two pages of image data to said page buffer from said storage means.

20. An image processing system according to claim 19, wherein said control means includes means for concurrently executing in a time divisional manner the data transfer between said data storage means and said page buffer, and one of the transfer of data through said data compressing means to said page buffer and the transfer of data through said data decompressing means to said image output section.

21. An image processing system according to claim 20, wherein said data compressing means, said data decompressing means, said data storage means, and said page buffer have a common data bus, and wherein priority to exclusively use said data bus is established among said data compressing means, said data decompressing means, said data storage means, and said page buffer.

22. The image processing system of claim 19, wherein said control means transfers one page of image data from said storage means to said page buffer subsequent to a transfer of one page of image data from said page buffer to said decompressing means.

23. The image processing system of claim 22, wherein said transfer of one page of image data from said page buffer to said decompressing means occurs in response to said transfer of one page of image data from said storage means to said page buffer.

* * * * *

UNITED STATES PATENT AND TRADEMARK OFFICE
CERTIFICATE OF CORRECTION

PATENT NO. : 5,229,866
DATED : July 20, 1993
INVENTOR(S) : Hideaki Kashiwagi et al.

It is certified that error appears in the above-indentified patent and that said Letters Patent is hereby corrected as shown below:

Claim 1, column 8, lines 44-45, delete "every page".

Claim 7, column 9, lines 48-49, delete "every page".

Signed and Sealed this

Twelfth Day of April, 1994

Attest:

BRUCE LEHMAN

Attesting Officer

Commissioner of Patents and Trademarks